United States Patent
Cariello

(10) Patent No.: US 11,861,177 B2
(45) Date of Patent: Jan. 2, 2024

(54) CONFIGURABLE VERIFY LEVEL FOR A SET OF DATA IN A MEMORY DEVICE

(71) Applicant: Micron Technology, Inc., Boise, ID (US)

(72) Inventor: Giuseppe Cariello, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 202 days.

(21) Appl. No.: 17/396,443

(22) Filed: Aug. 6, 2021

(65) Prior Publication Data

US 2023/0056398 A1  Feb. 23, 2023

(51) Int. Cl.
| G06F 3/06 | (2006.01) |
| G06F 3/00 | (2006.01) |
| G06F 11/10 | (2006.01) |
| G06F 11/00 | (2006.01) |

(52) U.S. Cl.
CPC .......... *G06F 3/0619* (2013.01); *G06F 3/0659* (2013.01); *G06F 3/0673* (2013.01); *G06F 11/1076* (2013.01)

(58) Field of Classification Search
CPC .... G06F 3/0619; G06F 3/0659; G06F 3/0673; G06F 11/1076
See application file for complete search history.

(56) References Cited

U.S. PATENT DOCUMENTS

| 2013/0124914 A1* | 5/2013 | Liu ..................... G06F 11/1666 714/6.1 |
| 2014/0281820 A1* | 9/2014 | Alrod ..................... G11C 16/10 714/773 |
| 2016/0179421 A1* | 6/2016 | Hwang ................. G06F 3/0685 711/162 |
| 2019/0114096 A1* | 4/2019 | Trika ..................... G06F 3/0619 |
| 2020/0004440 A1* | 1/2020 | Koudele ............... G11C 29/021 |
| 2021/0109667 A1* | 4/2021 | Christensen ........ G11C 11/5671 |
| 2022/0091935 A1* | 3/2022 | Kaynak ................. G06F 3/0611 |
| 2022/0291847 A1* | 9/2022 | Koudele ............ G11C 16/3459 |

\* cited by examiner

*Primary Examiner* — Justin R Knapp
(74) *Attorney, Agent, or Firm* — Holland & Hart LLP

(57) ABSTRACT

Methods, systems, and devices for configurable verify level are described. A host device may determine a target level of reliability for a set of data stored in a memory device. The host device may transmit, to the memory device, a command indicating the target level of reliability and a request to perform one or more error management operations for the set of data based on or in response to the target level of reliability. The memory device may determine the target level of reliability and the corresponding error management operations based on or in response to the command. The memory device may perform the error management operations for the set of data. The memory device may transmit, to the host device, an indication of a level of reliability of the set of data based on or in response to the command and performing the set of error management operations.

25 Claims, 8 Drawing Sheets

CONFIGURABLE VERIFY LEVEL FOR A SET OF DATA IN A MEMORY DEVICE

FIELD OF TECHNOLOGY

The following relates generally to one or more systems for memory and more specifically to a configurable verify level.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often corresponding to a logic 1 or a logic 0. In some examples, a single memory cell may support more than two possible states, any one of which may be stored by the memory cell. To access information stored by a memory device, a component may read, or sense, the state of one or more memory cells within the memory device. To store information, a component may write, or program, one or more memory cells within the memory device to corresponding states.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), 3-dimensional cross-point memory (3D cross point), not-or (NOR) and not-and (NAND) memory devices, and others. Memory devices may be volatile or non-volatile. Volatile memory cells (e.g., DRAM cells) may lose their programmed states over time unless they are periodically refreshed by an external power source. Non-volatile memory cells (e.g., NAND memory cells) may maintain their programmed states for extended periods of time even in the absence of an external power source.

DETAILED DESCRIPTION

Figure 1:
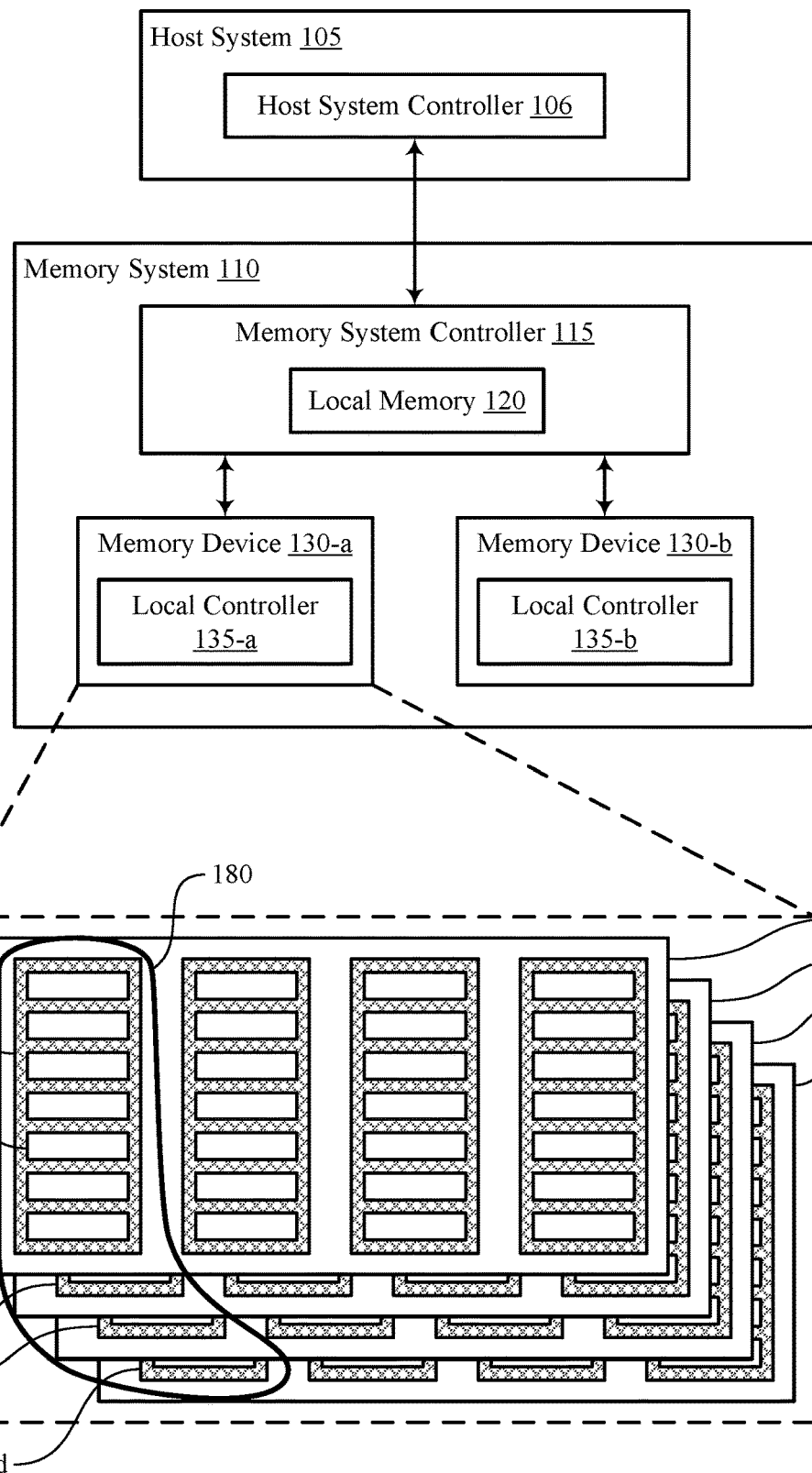
FIG. 1 illustrates an example of a system that supports a configurable verify level in accordance with examples as disclosed herein.

In some memory systems, a host device may transmit a verify command to a memory device. The verify command may indicate a set of data stored at the memory device and a request to check a reliability or validity of the set of data. The memory device may read the set of data based on or in response to the verify command to determine whether the set of data is valid or not. In some examples, the memory device may read a logic value corresponding to the data and compare the logic value with a threshold value to determine whether the set of data is valid. The memory device may transmit a verify command status response to the host device indicating whether the set of data is valid. If the set of data is not valid, the host device may issue read and write commands to re-write the set of data. In some examples, the host device may set an enable early recovery (EER) bit in a verify error recovery mode page corresponding to the verify command. The memory device may perform an error recovery procedure according to a duration that is based or in response to a value of the EER bit. The host device may set the EER bit based on or in response to a target level of reliability for the set of data. In some examples, however, the EER bit may not provide sufficient granularity for the host device to accurately indicate the target level of reliability. Moreover, the EER bit may indicate a duration of an error handling operation, but the EER bit may not correspond to the target level of reliability for the set of data. Additionally or alternatively, setting the EER bit and performing the error handling operation may result in increased latency and relatively high power consumption.

Systems, devices, and techniques are described to provide for the host device to indicate one or more target levels of reliability and one or more corresponding error management operations via the verify command, which may provide for finer granularity and reduced latency and power consumption. The host device may determine a target level of reliability for a set of data based on or in response to one or more commands to be executed for the set of data, a mode of operation corresponding to the set of data, physical stressors the set of data may experience, or the like. In some examples, the target level of reliability may be selected from a set of possible target levels of reliability. A bit, a bit field, or an attribute associated with the verify command may be configured to indicate the target level of reliability. The bit, the bit field, or the attribute may indicate one or more error management operations associated with the target level of reliability, or the memory device may be configured with a set of error management operations corresponding to each target level of reliability. The memory device may read and verify the set of data and perform the indicated error management operations based on or in response to the verify command and a current level of reliability of the data. The error management operations may include an error correction operation according to a reduced error correction capability, a read margin adjustment operation, a refresh operation, an error handling operation, or any combination thereof, in accordance with the target level of reliability. Indicating a target level of reliability and corresponding error management operations via a verify command as described herein may provide for reduced power consumption and reduced latency, thereby improving error management procedures and a reliability of data stored at the memory device.

Figure 2:
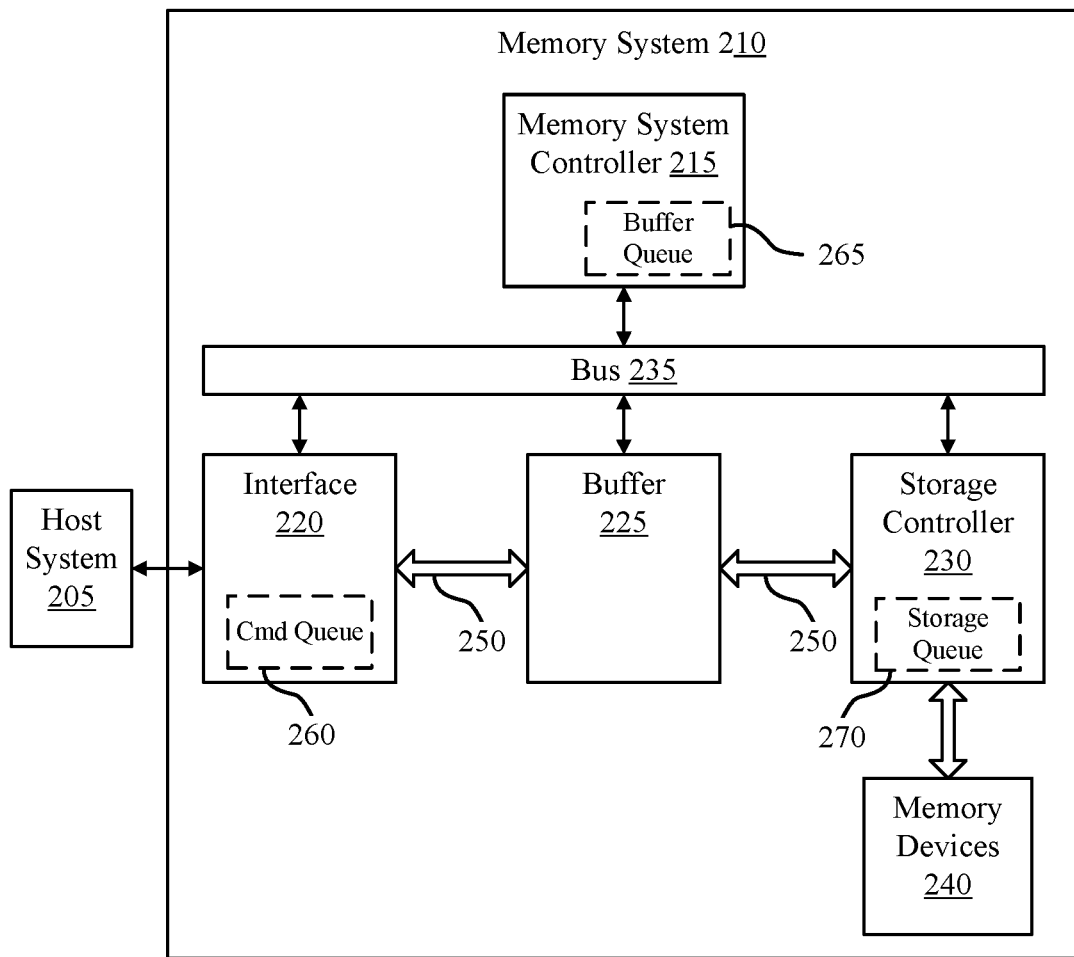
FIG. 2 illustrates an example of a system that supports a configurable verify level in accordance with examples as disclosed herein.
Figure 3:
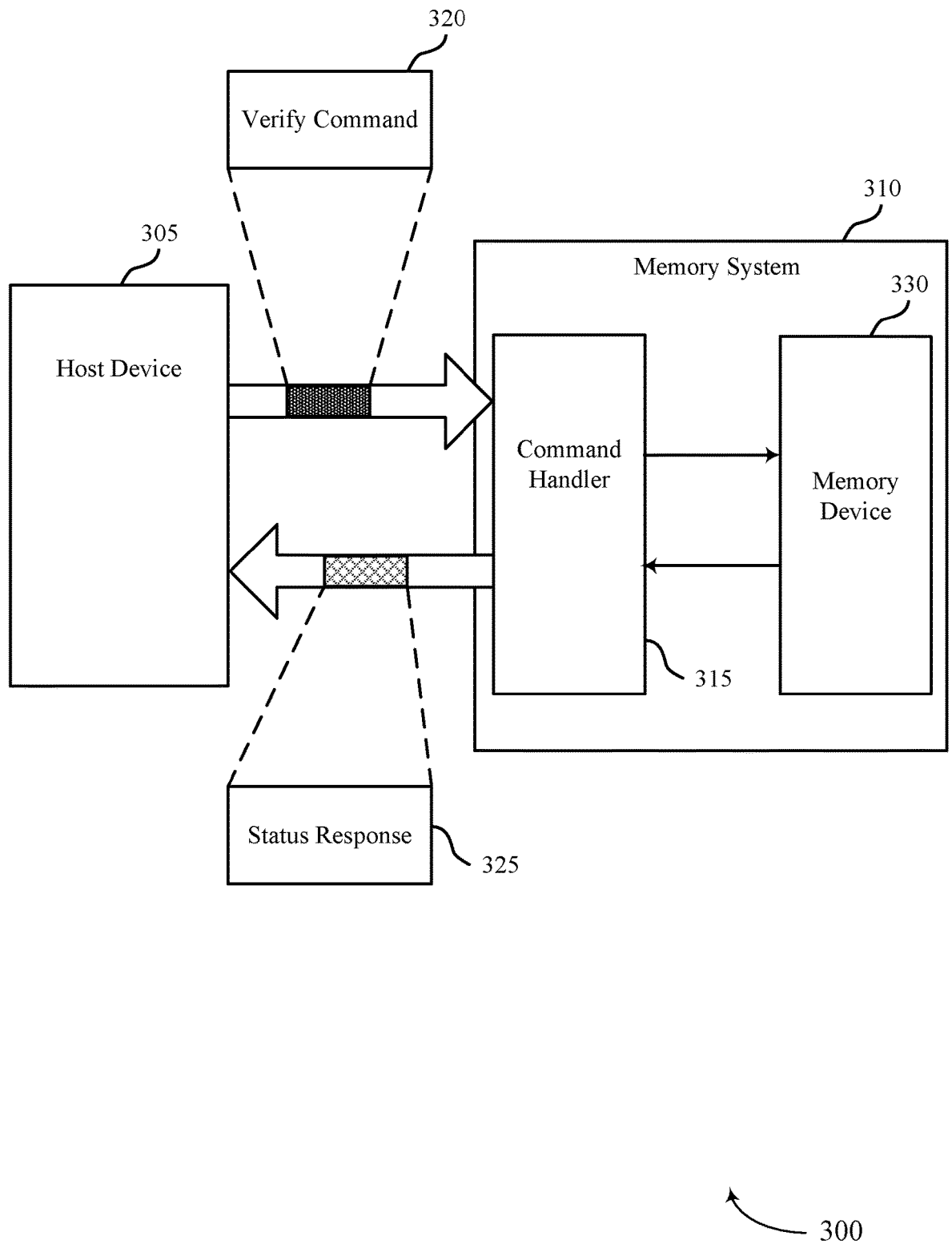
FIG. 3 illustrates an example of a system that supports a configurable verify level in accordance with examples as disclosed herein.

Features of the disclosure are initially described in the context of systems, devices, and circuits with reference to FIGS. 1 through 3. Features of the disclosure are described in the context of a flow diagram with reference to FIG. 4. These and other features of the disclosure are further illustrated by and described in the context of apparatus diagrams and flowcharts that relate to configurable verify level with reference to FIGS. 5 through 8.

FIG. 1 illustrates an example of a system 100 that supports a configurable verify level in accordance with examples as disclosed herein. The system 100 includes a host system 105 coupled with a memory system 110.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other possibilities.

The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices, and in some cases may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may in some cases be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally or alternatively include static random access memory (SRAM) or other memory that may be used by the memory system controller 115 for internal storage or calculations, for example, related to the functions ascribed herein to the memory system controller 115. Additionally or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally or alternatively rely upon an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may in some cases instead be performed by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (RAM) (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a memory die 160. For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170, and in some cases, concurrent operations may take place within different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165c, and 165-d, respectively, and blocks 170-a, 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in a same page 175 may share (e.g., be coupled with) a common word line, and memory cells in a same string may share (e.g., be coupled with) a common digit line (which may alternatively be referred to as a bit line).

For some NAND architectures, memory cells may be read and programmed (e.g., written) at a first level of granularity (e.g., at the page level of granularity) but may be erased at a second level of granularity (e.g., at the block level of granularity). That is, a page 175 may be the smallest unit of memory (e.g., set of memory cells) that may be independently programmed or read (e.g., programmed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may in some cases not be updated until the entire block 170 that includes the page 175 has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

The system 100 may include any quantity of non-transitory computer readable media that support configurable verify level. For example, the host system 105, the memory system controller 115, or a memory device 130 may include or otherwise may access one or more non-transitory computer readable media storing instructions (e.g., firmware) for performing the functions ascribed herein to the host system 105, memory system controller 115, or memory device 130. For example, such instructions, if executed by the host system 105 (e.g., by the host system controller 106), by the memory system controller 115, or by a memory device 130 (e.g., by a local controller 135), may cause the host system 105, memory system controller 115, or memory device 130 to perform one or more associated functions as described herein.

In some cases, a memory system 110 may utilize a memory system controller 115 to provide a managed memory system that may include, for example, one or more memory arrays and related circuitry combined with a local (e.g., on-die or in-package) controller (e.g., local controller 135). An example of a managed memory system is a managed NAND (MNAND) system.

In some cases, the host system 105 (e.g., a host system controller 106) may transmit a verify command to the memory system 110. The verify command may indicate a set of data stored at a memory device 130 and a request to check a reliability or validity of the set of data. The memory system 110 (e.g., the memory system controller 115, a local controller 135 associated with the memory device 130, or some other component within the memory system 110) may read the set of data based on or in response to the verify command to determine whether the set of data is valid or not. In some examples, the memory system 110 may read a logic value corresponding to the data and compare the logic value with a threshold value to determine whether the set of data is valid. The memory system 110 may transmit a verify command status response to the host system 105 indicating whether the set of data is valid.

If the set of data is not valid, the host system 105 may issue a read and write operation to re-write the set of data. Additionally or alternatively, the host system 105 may set an EER bit in a verify error recovery mode page corresponding to the verify command. The memory system 110 may perform an error recovery procedure, and a duration of the error recovery procedure may be based or in response to a value of the EER bit. Setting the EER bit and performing the error recovery procedures may, however, result in relatively high power consumption and latency associated with performing a verify operation. Moreover, the EER bit may indicate a duration of an error handling operation, but the EER bit may not correspond to maintaining or ensuring a target level of reliability for the set of data.

Systems, devices, and techniques are described to provide for the host system 105 to indicate one or more target levels of reliability and one or more corresponding error management operations via the verify command. The host system 105 may determine a target level of reliability for a set of data based on or in response to one or more commands to be executed for the set of data, a mode of operation corresponding to the set of data, physical stressors the set of data may experience, or the like. In some examples, the target level of reliability may be selected from a set of possible target levels of reliability. A bit, a bit field, or an attribute associated with the verify command may be configured to indicate the target level of reliability. The bit, the bit field, or the attribute may indicate one or more error management operations associated with the target level of reliability, or the memory system 110 may be configured with a set of error management operations corresponding to each target level of reliability.

The memory system 110 may read and verify the set of data stored by the memory device 130. The memory system 110 may perform the indicated error management operations based on or in response to the verify command and a current level of reliability of the data. The error management operations may include an error correction operation according to a reduced error correction capability, a read margin adjustment operation, a refresh operation, an error handling operation, or any combination thereof, in accordance with the target level of reliability. Indicating a target level of reliability and corresponding error management operations via a verify command, as described herein, may provide for reduced power consumption and reduced latency, thereby improving error management procedures and a reliability of data stored at the memory device 130.

FIG. 2 illustrates an example of a system 200 that supports a configurable verify level in accordance with examples as disclosed herein. The system 200 may be an example of a system 100 as described with reference to FIG. 1 or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include memory devices 240 to store data transferred between the memory system 210 and the host system 205, e.g., in response to receiving access commands from the host system 205, as described herein. The memory devices 240 may include one or more memory devices as described with reference to FIG. 1. For example, the memory devices 240 may include NAND memory, PCM, self-selecting memory, 3D cross point, other chalcogenide-based memories, FERAM, MRAM, NOR (e.g., NOR flash) memory, STT-MRAM, CBRAM, RRAM, or OxRAM.

The memory system 210 may include a storage controller 230 for controlling the passing of data directly to and from the memory devices 240, e.g., for storing data, retrieving data, and determining memory locations in which to store data and from which to retrieve data. The storage controller 230 may communicate with memory devices 240 directly or via a bus (not shown) using a protocol specific to each type of memory device 240. In some cases, a single storage controller 230 may be used to control multiple memory devices 240 of the same or different types. In some cases, the memory system 210 may include multiple storage controllers 230, e.g., a different storage controller 230 for each type of memory device 240. In some cases, a storage controller 230 may implement aspects of a local controller 135 as described with reference to FIG. 1.

The memory system 210 may additionally include an interface 220 for communication with the host system 205 and a buffer 225 for temporary storage of data being transferred between the host system 205 and the memory devices 240. The interface 220, buffer 225, and storage controller 230 may be for translating data between the host system 205 and the memory devices 240, e.g., as shown by a data path 250, and may be collectively referred to as data path components.

Using the buffer 225 to temporarily store data during transfers may allow data to be buffered as commands are being processed, thereby reducing latency between commands and allowing arbitrary data sizes associated with commands. This may also allow bursts of commands to be handled, and the buffered data may be stored or transmitted (or both) once a burst has stopped. The buffer 225 may include relatively fast memory (e.g., some types of volatile memory, such as SRAM or DRAM) or hardware accelerators or both to allow fast storage and retrieval of data to and from the buffer 225. The buffer 225 may include data path switching components for bi-directional data transfer between the buffer 225 and other components.

The temporary storage of data within a buffer 225 may refer to the storage of data in the buffer 225 during the execution of access commands. That is, upon completion of an access command, the associated data may no longer be maintained in the buffer 225 (e.g., may be overwritten with data for additional access commands). In addition, the buffer 225 may be a non-cache buffer. That is, data may not be read directly from the buffer 225 by the host system 205. For example, read commands may be added to a queue without an operation to match the address to addresses already in the buffer 225 (e.g., without a cache address match or lookup operation).

The memory system 210 may additionally include a memory system controller 215 for executing the commands received from the host system 205 and controlling the data path components in the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, and a storage queue 270) may be used to control the processing of the access commands and the movement of the corresponding data. This may be beneficial, e.g., if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if used, may be positioned anywhere within the memory system 210.

Data transferred between the host system 205 and the memory devices 240 may take a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220, e.g., according to a protocol (e.g., a UFS protocol or an eMMC protocol). Thus, the interface 220 may be considered a front end of the memory system 210. Upon receipt of each access command, the interface 220 may communicate the command to the memory system controller 215, e.g., via the bus 235. In some cases, each command may be added to a command queue 260 by the interface 220 to communicate the command to the memory system controller 215.

The memory system controller 215 may determine whether an access command has been received based on or in response to the communication from the interface 220. In some cases, the memory system controller 215 may determine that the access command has been received by retrieving the command from the command queue 260. The command may be removed from the command queue 260 after it has been retrieved therefrom, e.g., by the memory system controller 215. In some cases, the memory system controller 215 may cause the interface 220, e.g., via the bus 235, to remove the command from the command queue 260.

Upon the determination that an access command has been received, the memory system controller 215 may execute the access command. For a read command, this may mean obtaining data from the memory devices 240 and transmitting the data to the host system 205. For a write command, this may mean receiving data from the host system 205 and moving the data to the memory devices 240.

In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may first determine whether the buffer 225 has sufficient available space to store the data associated with the command. For example, the memory system controller 215 may determine, e.g., via firmware (e.g., controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. That is, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), e.g., according to a protocol (e.g., a UFS protocol or an eMMC protocol). As the interface 220 subsequently receives from the host system 205 the data associated with the write command, the interface 220 may transfer the data to the buffer 225 for temporary storage using the data path 250. In some cases, the interface 220 may obtain from the buffer 225 or buffer queue 265 the location within the buffer 225 to store the data. The interface 220 may indicate to the memory system controller 215, e.g., via the bus 235, if the data transfer to the buffer 225 has been completed.

Once the write data has been stored in the buffer 225 by the interface 220, the data may be transferred out of the buffer 225 and stored in a memory device 240. This may be done using the storage controller 230. For example, the memory system controller 215 may cause the storage controller 230 to retrieve the data out of the buffer 225 using the data path 250 and transfer the data to a memory device 240. The storage controller 230 may be considered a back end of the memory system 210. The storage controller 230 may indicate to the memory system controller 215, e.g., via the bus 235, that the data transfer to a memory device of the memory devices 240 has been completed.

In some cases, a storage queue 270 may be used to aid with the transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain from the buffer 225, buffer queue 265, or storage queue 270 the location within the buffer 225 from which to obtain the data. The storage controller 230 may manage the locations within the memory devices 240 to store the data (e.g., performing wear-leveling, garbage collection, and the like). The entries may be added to the storage queue 270, e.g., by the memory system controller 215. The entries may be removed from the storage queue 270, e.g., by the storage controller 230 or memory system controller 215 upon completion of the transfer of the data.

To process a read command received from the host system 205, the memory system controller 215 may again first determine whether the buffer 225 has sufficient available space to store the data associated with the command. For example, the memory system controller 215 may determine, e.g., via firmware (e.g., controller firmware), an amount of space within the buffer 225 that may be available to store data associated with the read command.

In some cases, the buffer queue 265 may be used to aid with buffer storage of data associated with read commands in a similar manner as discussed above with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215, e.g., via the bus 235, in response to completion of the data transfer to the buffer 225.

In some cases, the storage queue 270 may be used to aid with the transfer of read data. For example, the memory system controller 215 may push the read command to the storage queue 270 for processing. In some cases, the storage controller 230 may obtain from the buffer 225 or storage queue 270 the location within the memory devices 240 from which to retrieve the data. In some cases, the storage controller 230 may obtain from the buffer queue 265 the location within the buffer 225 to store the data. In some cases, the storage controller 230 may obtain from the storage queue 270 the location within the buffer 225 to store the data. In some cases, the memory system controller 215 may move the command processed by the storage queue 270 back to the command queue 260.

Once the data has been stored in the buffer 225 by the storage controller 230, the data may be transferred out of the buffer 225 and sent to the host system 205. For example, the memory system controller 215 may cause the interface 220 to retrieve the data out of the buffer 225 using the data path 250 and transmit the data to the host system 205, e.g., according to a protocol (e.g., a UFS protocol or an eMMC protocol). For example, the interface 220 may process the command from the command queue 260 and may indicate to the memory system controller 215, e.g., via the bus 235, that the data transmission to the host system 205 has been completed.

The memory system controller 215 may execute received commands according to an order (e.g., a first-in, first-out order, according to the order of the command queue 260).

For each command, the memory system controller 215 may cause data corresponding to the command to be moved into and out of the buffer 225, as discussed above. As the data is moved into and stored within the buffer 225, the command may remain in the buffer queue 265. A command may be removed from the buffer queue 265, e.g., by the memory system controller 215, if the processing of the command has been completed (e.g., if data corresponding to the access command has been transferred out of the buffer 225). If a command is removed from the buffer queue 265, the address previously storing the data associated with that command may be available to store data associated with a new command.

The memory system controller 215 may additionally be configured for operations associated with the memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. That is, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the above operations in conjunction with or instead of the memory system controller 215. In some cases, the memory system controller 215 may perform the functions of the storage controller 230 and the storage controller 230 may be omitted.

In some cases, the host system 205 may transmit a verify command to the memory system 210. The verify command may indicate a set of data stored in a memory device 240 of the memory system 210 and a request to verify a reliability of the set of data. The memory system 210 may read data from the media and transmit a verify command status response to the host system 205 indicating the validity of the data based on or in response to the verify command. In some examples, if the data is not valid, the host system 205 may perform a read and write procedure to write-back the data. In some examples, the host system 205 may set an EER bit in a verify error recovery mode page corresponding to the verify command. The EER bit may indicate a request for the memory system 210 to perform an error handling operation for the set of data and a duration for performing the error handling operation. For example, an EER bit set to one may indicate a shorter duration for performing the error handling operation than an EER bit set to zero. The host system 205 may set the EER bit based on or in response to a target level of reliability for the set of data. In some examples, however, the EER bit may not provide sufficient granularity for the host system 205 to accurately indicate the target level of reliability. Additionally or alternatively, setting the EER bit to detect marginal data may prevent the memory system 210 from recovering data. In such cases, the host system 205 may read data after resetting the EER bit and write back the read data to the memory system 210 (e.g., to a memory device 240 in the memory system 210) to force refresh and restore data reliability. The extra read and write operations associated with the EER bit may result in increased latency and relatively high power consumption.

In some examples, the host system 205 may indicate a target level of reliability and one or more error management operations corresponding to the target level of reliability via the verify command, which may provide for finer granularity, reduced latency, and reduced power consumption. The host system 205 may determine the target level of reliability for a set of data based on or in response to one or more commands to be executed for the set of data, a mode of operation corresponding to the set of data, physical stressors the set of data may experience, or the like. In some examples, the target level of reliability may be selected from a set of possible target levels of reliability. A bit, a bit field, or an attribute associated with the verify command may be configured to indicate the target level of reliability. The bit, the bit field, or the attribute may indicate one or more error management operations associated with the target level of reliability, or the memory system 210 may be configured with a set of error management operations corresponding to each target level of reliability. The memory system 210 may read and verify the set of data and perform the indicated error management operations based on or in response to the verify command and a current level of reliability of the data. The error management operations may include an error correction operation according to a reduced error correction capability, a read margin adjustment operation, a refresh operation, an error handling operation, or any combination thereof, in accordance with the target level of reliability. Indicating a target level of reliability and corresponding error management operations via a verify command, as described herein, may provide for reduced power consumption and reduced latency, thereby improving error management procedures and a reliability of data stored at the memory device.

FIG. 3 illustrates an example of a system 300 that supports a configurable verify level in accordance with examples as disclosed herein. The system 300 may be an example of a system 100 or a system 200 as described with reference to FIGS. 1 and 2. The system 300 may include a memory system 310 and a host device 305. The memory system 310 may include a command handler 315 and a memory device 330 configured to store data. The system 300 may support an interface for the host device 305 to transmit a verify command 320 (e.g., among other commands, such as read or write commands) to the memory system 310 and receive a status report from the memory system 310 in response to the verify command 320.

The memory system 310 may include the command handler 315 which may function as an interface between the host device 305 and memory system 310. The command handler 315 may be an example of one or a combination of exemplary devices as described with reference to FIG. 2. For example, the command handler 315 may be an example of an interface 220, a memory system controller 215, a storage controller 230, or a combination thereof. The memory system 310 may include a memory device 330, which may be an example of the memory devices described with reference to FIGS. 1 and 2.

The host device 305 may transmit one or more commands, such as read commands, write commands, or verify commands 320, which may indicate operations to be performed by the memory system 310. The host device 305 may transmit the commands to the command handler 315, and the command handler 315 may decode the commands and access the relevant data stored in the memory device 330 or forward the commands to the memory device 330 (e.g., a controller of the memory device 330).

The host device 305 may transmit the verify command 320 to the memory system 310 to request the memory system 310 to check for errors in data stored in the memory device 330. In some examples, the host device 305 may transmit the verify command 320 to determine whether the data is corrupted by other operations performed on the memory device 330, or the host device 305 may transmit the verify command 320 to identify which data, of a set of data that may be duplicated in the memory device 330, is associated with a highest reliability. The verify command 320 may indicate a starting logical block address in the memory device 330 and a quantity of contiguous logical blocks of data (e.g., a range, or set, of data) that are targeted for the corresponding verify operation.

The command handler 315 may receive and decode the verify command 320 to identify the set of data. The command handler 315, the memory system 310, the memory device 330, or any combination thereof may read the indicated set of data to determine a level of reliability associated with the set of data. In some examples, the command handler 315 may determine a reliability of the data by reading a logic level associated with the set of data and comparing the logic level with a threshold level, which may be referred to as a read margin. The command handler 315 may thereby determine whether there are errors in the set of data or not (e.g., whether the data is valid or not). The command handler 315 may transmit a verify command status response 325 to the host device 305 to indicate whether the set of data is valid or not. In some examples, the status response 325 may transmitted via a UFS protocol interface unit (UPIU). The host device 305 may thereby receive the status response 325 indicating a quality or reliability of the set of data without initiating a read operation, which may reduce processing and latency.

In some examples, the host device 305 may determine, prior to issuing the verify command 320, a target level of reliability for the set of data based on one or more operations to be performed for the set of data. The target level of reliability may correspond to a level of reliability that may provide for the set of data to retain stored information properly during the one or more operations or other physical stressors, such as an over-the-air (OTA) update operation, or rework on a board of the memory device 330 (e.g., if the set of data is subject to extended time in high temperatures, soldering or other rework to the memory device 330, or other stressors). In some cases, if the status response 325 indicates that the set of data is not valid, the host device 305 may initiate one or more error management procedures for the set of data. In some cases, however, it may be beneficial for the host device 305 to utilize the verify command 320 to determine whether the target level of reliability is met for the set of data and to indicate error management recovery procedures for correcting any errors in the set of data.

In some cases, the host device 305 may utilize a verify error recovery mode page corresponding to the verify command 320 to indicate error recovery parameters the memory device 330 may use while performing the verify operation. The verify error recovery mode page may be configured to convey the one or more error recovery parameters to the memory device 330 for use in conjunction with the verify command 320. The host device 305 may, in some cases, set one or more of the error recovery parameters in the verify error recovery mode page based on or in response to the target level of reliability for the set of data. For example, the host device 305 may set an EER bit in the verify error recovery mode page high or low (e.g., 1 or 0) based on or in response to the target level of reliability for the set of data. The EER bit may indicate a rate of an error recovery procedure to be performed by the memory device 330 in response to the verify command 320.

The error recovery procedure may include one or more reads of the set of data by the memory device 330. If the memory device 330 identifies that the data is not corrupt after a first read, the memory device 330 may terminate the error recovery procedure and indicate that the data is valid to the command handler 315. The command handler 315 may transmit the status response 325 indicating a status of GOOD to the host device 305. If the memory device 330 identifies an error, the memory device 330 may continue to read the data for a configured quantity of reads (e.g., re-read attempts) using different array and error correcting-codes (ECC) settings to recover the set of data. If the host device 305 sets the EER bit low in the verify command recovery mode page, the memory device 330 will perform an error recovery procedure that may reduce a risk of error mis-detection, which may be a relatively slow error recovery procedure. That is, the memory device 330 may perform each of the configured quantity of reads before using ECC.

If the EER bit is set high, the memory device 330 will perform a relatively expedient error recovery procedure to correct the identified errors in the data. That is, the memory device 330 may not exhaust the quantity of reads before using ECC, which may increase a probability of an error mis-detection but may reduce latency and power consumption.

The host device 305 may set the EER bit high if the host device 305 determines a relatively high target level of reliability for the set of data (e.g., if the set of data includes critical data, or is subject to relatively high stressors, such as extended time in high temperatures, soldering or other rework to a board, or other stressors). If the set of data is marginally reliable and the EER bit is set high, the memory device 330 may refresh the set of data (e.g., re-write or correct the set of data) more often than if the EER bit is not set. The host device 305 may set the EER bit low if the host device 305 determines a relatively low target level of reliability for the set of data.

If the memory device 330 identifies an error in the set of data while performing the verify operation based on or in response to the EER bit, the memory device 330 will indicate the error to the command handler 315. The command handler 315 may transmit a failed status response 325 to the host device 305 (e.g., a status response of CHECK CONDITION). In some cases, in response to a failed status report, the host device 305 may issue a read command to retrieve data from the memory device 330 and re-write the data in response to the failed verify command, which may further increase latency and power consumption.

Setting the EER bit in the verify command recovery mode page may thereby result in relatively large power consumption and increased latency associated with the verify operation. Additionally, the EER bit indicates a rate at which the memory device 330 is to perform an error recovery procedure. The EER bit does not directly correspond to a reliability of the set of data or to different error management operations that may be used to recover the set of data if an error is present. That is, although the host device 305 may adjust a duration of error recovery and power consumption associated with performing error recovery by setting the EER bit, the host device 305 may not indicate the target level of reliability to the memory system 310 using the EER bit. Additionally or alternatively, the EER bit may not provide sufficient granularity for the host device 305. For example, the EER bit may not provide for the host device 305 to indicate more than two levels of error recovery.

As described herein, a command descriptor block (CDB) of the verify command 320 may indicate a target level of reliability for the set of data and one or more error management operations corresponding to the target level of reliability. As such, the memory device 330 may perform the indicated error management operations in response to the verify command 320 to verify that the set of data meets the target level of reliability. By using the verify command 320 to indicate different levels of verify operations, the host device 305 may improve latency and power consumption associated with verify operations. For example, the host device 305 may balance reliability, power consumption, and latency by selecting the target level of reliability from a set of configured target levels of reliability based on or in response to one or more commands to be executed by the memory device 330, a mode of operation of the memory device 330 or the memory system 310, other physical stressors the memory device 330 may experience, a time available for performing the verify operation, a reliability, or any combination thereof.

Each target level of reliability may correspond to one or more error management operations, such as an error correction operation according to a reduced error correction capability, a read margin adjustment operation, a refresh operation, an error handling operation, one or more other error management operations, or any combination thereof. The reduced error correction capability may correspond to the error correction operation being performed in a configured time period. The error correction operation may represent an example of one or more types of error correction operations that use ECC to correct errors in the set of data. For example, the memory device 330 may use low-density parity-check (LDPC) codes, or other error handling algorithms to adjust a read margin for each read attempt for the set of data. In some examples, the error correction operations may take more time to recover data that is more marginal than other data that is less marginal. The reduced error correction capability may indicate a configured time period for performing the error correction operation, which may reduce a level of marginality of the data that may be recovered. However, the configured time period may reduce latency and power consumption associated with performing the error correction operation.

The read margin adjustment operation may correspond to the memory device 330 adjusting a read margin during one or more marginal reads to verify the set of data (e.g., check a reliability of the set of data). The read margin, which may be referred to as a threshold read margin, may correspond to a reference voltage value that may indicate a logic value stored in a memory cell. For example, if a potential that is read from a memory cell (e.g., a single-level memory cell) is above the threshold read margin, the memory device 330 determines that the memory cell stores a logic 1. If the potential is below the threshold read margin, the memory device 330 determines that the memory cell stores a logic 0. In some examples, error may distort a threshold voltage distribution of voltages corresponding to each logic value, such that a potential associated with a memory cell that stores a logic value of 1 may be below the threshold read margin, or vice versa. By performing the read margin adjustment operation, the memory device 330 may increase and/or decrease the threshold read margin for one or more reads to determine how marginal the set of data is, which may indicate a level of reliability of the set of data.

The read margin adjustment operation may indicate a validity of the data to ensure whether the set of data will be accurately stored in the future (e.g., after operations are performed for the set of data or the data is exposed to physical stressors). A quantity by which the threshold read margin may be adjusted (e.g., an adjustment range in volts, or millivolts) during the operation may correspond to the target level of reliability. For example, a relatively high target level of reliability may correspond to a greater adjustment range than a relatively low target level of reliability. In some examples, the adjustment range may be configured for each target level of reliability. Additionally or alternatively, the adjustment range for each target level of reliability may be determined for the memory device 330 at design time or based on or in response to one or more defined parameters or settings for the memory device 330.

The host device 305 may thereby transmit the verify command 320 indicating a target level of reliability from a set of target levels of reliability for a verify operation performed for a set of data in the memory device 330. The verify command 320 may indicate a request for the memory device 330 to perform one or more of the error management operations that correspond to the target level of reliability, which may reduce latency and power consumption for verify operations. The verify command and the target levels of reliability are described in further detail elsewhere herein, including with reference to FIG. 4.

Figure 4:
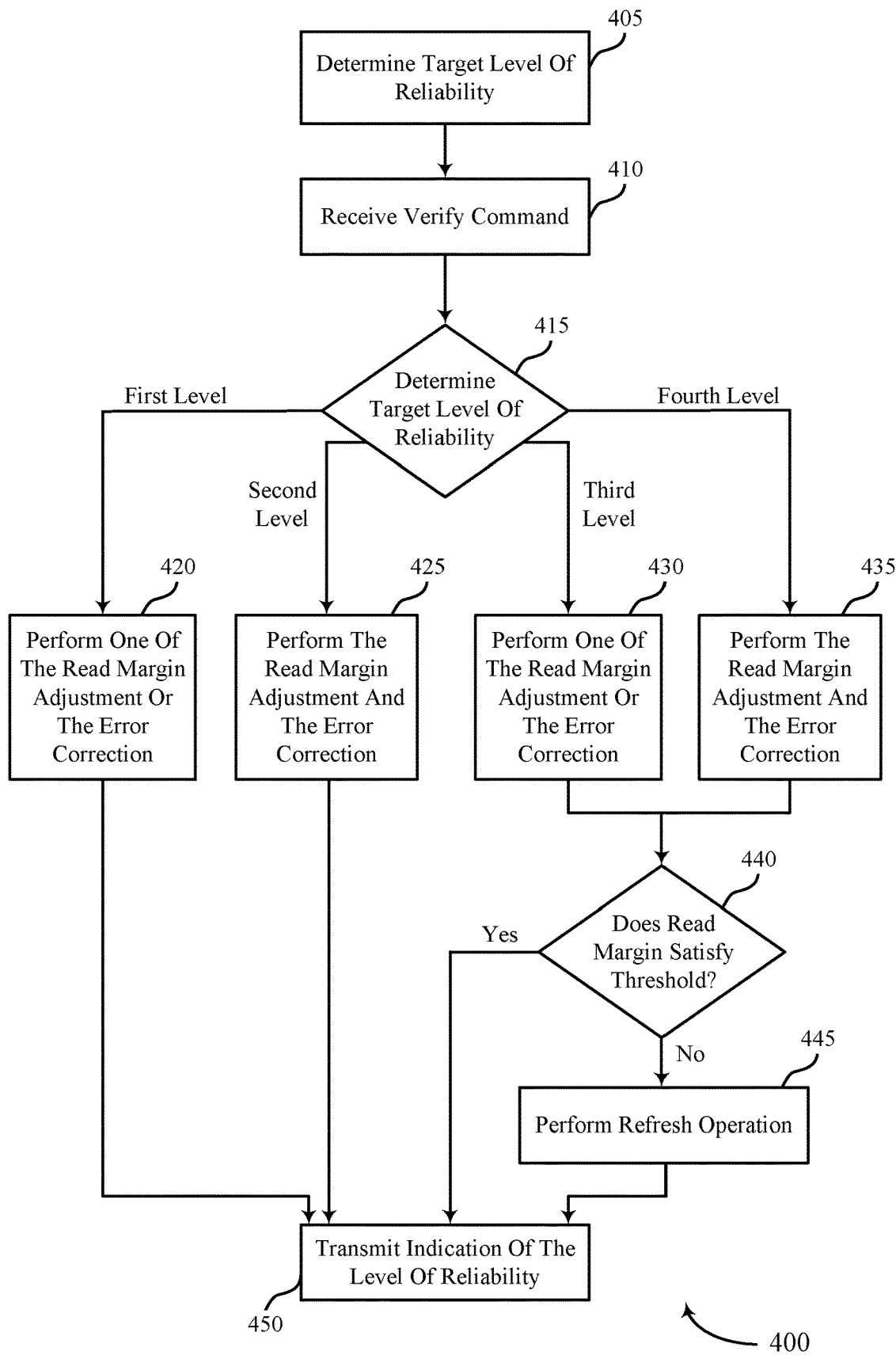
FIG. 4 illustrates an example of a flow diagram that supports a configurable verify level in accordance with examples as disclosed herein.

FIG. 4 illustrates an example of a flow diagram 400 that supports a configurable verify level in accordance with examples as disclosed herein. The flow diagram 400 may illustrate a process that may be implemented by a system 100 (or one or more components thereof), a system 200 (or one or more components thereof), or a system 300 (or one or more components thereof) as described with reference to FIGS. 1-3. The flow diagram may illustrate a process for performing verify operations based on or in response to a configurable verify command.

Aspects of the flow diagram 400 may be implemented by one or more controllers, among other components (e.g., a memory system controller of a memory system, a command handler of the memory system, a host system controller of a host system). Additionally or alternatively, aspects of the flow diagram 400 may be implemented as instructions stored in memory (e.g., firmware stored in a memory coupled with the memory system). For example, the instructions, if executed by a controller, may cause the controller to perform the operations of the flow diagram 400. Alternative examples of the following may be implemented in which some operations are performed in a different order than described or are not performed at all. In some cases, operations may include features not mentioned below, or additional operations may be added.

At 405, a target level of reliability for a set of data stored in a memory device may be determined. In some examples, the host device may determine the target level of reliability for the set of data. The host device may determine the target level or reliability based on or in response to one or more commands to be executed on the set of data, a mode of operation associated with the memory device or the memory system that includes the memory device, time available for the host device to execute the verify command and corresponding verify operation, a size of the set of data (e.g., a logic range), physical stressors associated with the set of data, or the like. That is, the target level of reliability may be based on or in response to a tradeoff between time and reliability for the set of data. In some examples, the memory device may indicate a level of reliability for the set of data to the host device, and the host device may determine the target level of reliability based on or in response to the indicated level of reliability.

At 410, a command may be received. In some examples, the memory device may receive the command from the host device based on or in response to the host device determining the target level of reliability. The command may be a verify command and may indicate the target level of reliability for the set of data. The command may indicate a request to perform one or more error management operations for the set of data based on or in response to the target level of reliability. The memory device may identify, in the command (e.g., in a CDB of the command), a bit, a bit field, or an attribute configured to indicate the target level of reliability. An example verify command CDB is illustrated in Table 1.

TABLE 1

Example Verify Command CDB

| Byte | Bit 7 | 6 | 5 | 4 | 3 | 2 | 1 | 0 |
|---|---|---|---|---|---|---|---|---|
| 0 | OPERATION CODE (2Fh) | | | | | | | |
| 1 | VRPROTECT = 000b | | DPO = 0b | Reserved | | BYTCHK = 0b | | Obsolete = 0b |
| 2 | | | | | | | | |
| 3 | LOGICAL BLOCK ADDRESS | | | | | | | |
| 4 | | | | | | | | |
| 5 | | | | | | | | |
| 6 | Reserved | | | GROUP NUMBER = 00000b | | | | |
| 7 | VERIFICATION LENGTH | | | | | | | |
| 8 | | | | | | | | |
| 9 | CONTROL = 00h | | | | | | | |

As illustrated by the example verify command CDB in Table 1, a verify command CDB may include a set of bits configured to indicate an LBA for the set of data selected for the verify operation. For example, the verify command CDB may indicate a least significant bit and a most significant bit corresponding to the LBA for the set of data. The verify command CDB may additionally or alternatively include an operation code indicative of the type of command and one or more sets of reserved bits. In some examples, the bit, the bit field, or both may be selected from the set of reserved bits within the verify command CDB to convey the target level of reliability and the one or more error management operations for the verify operation. If the target level of reliability is conveyed via the bit field, each target level of reliability and each error management operation may be associated with one or more bits in the bit field, and the host device may select, or indicate, which target level or error management operations are to be performed during the verify operation using a bit mask to select the respective bits. In other words, each target level of reliability may correspond to a different combination of bits in the bit field.

In some examples, the target level of reliability and the one or more corresponding error management operations may be indicated via an attribute associated with the verify command. An example attribute dedicated for indicating a level of reliability for a verify operation is illustrated in Table 2. The attribute may provide for the host device to indicate the target level of reliability and corresponding error management operations without changing or altering the verify command CDB. In some examples, the attribute may include parameters for a UFS device.

TABLE 2

Example Verify Command Attribute

| IDN | Name | Access Property | Size | Type # Ind. # Sel. | MDV | Description | Notes |
|---|---|---|---|---|---|---|---|
| | bVerifyOpQualifiers | Read/Persistent | 1 | D | 0 | 0 = Normal | Etc. |

At 415, the target level of reliability may be determined from a set of target levels of reliability. In some examples, the memory device may determine which target level of reliability of the set of target levels of reliability is indicated for the set of data based on or in response to the command (e.g., based on or in response to a value of the bit, a value of the bit field, or one or more parameters conveyed via the attribute). The set of target levels of reliability may be configured for the memory device, and each target level of reliability of the set may correspond to a respective set of the one or more error management operations. Additionally or alternatively, the memory device may determine the one or more error management operations based on an indication in the verify command.

The one or more error management operations may include an error correction operation according to a reduced error correction capability, a read margin adjustment operation, a refresh operation, an error handling operation, one or more other error management operations, or any combination thereof. The error management operations may represent examples of the error management operations described with reference to FIG. 3.

The memory device may thereby identify one or more error management operations corresponding to the target level of reliability for the set of data based on or in response to the command.

At 420, if the target level of reliability is a first target level of reliability of the set of target levels of reliability, one of the read margin adjustment operation or the error correction operation may be performed. In some examples, the memory device may perform the one of the read margin adjustment operation or the error correction operation for the set of data based on or in response to the command and the first target level of reliability, where the first target level of reliability may correspond to one of the read margin adjustment operation or the error correction operation.

At 425, if the target level of reliability is a second target level of reliability of the set of target levels of reliability, both the read margin adjustment operation and the error correction operation may be performed. In some examples, the memory device may perform the read margin adjustment operation and the error correction operation for the set of data based on or in response to the command and the second target level of reliability, where the second target level of reliability may correspond to both of the read margin adjustment operation and the error correction operation.

At 430, if the target level of reliability is a third target level of reliability of the set of target levels of reliability, one of the read margin adjustment operation or the error correction operation may be performed. In some examples, the memory device may perform the one of the read margin adjustment operation or the error correction operation for the set of data based on or in response to the command and the third target level of reliability, where the third target level of reliability may correspond to one of the read margin adjustment operation or the error correction operation. The third target level of reliability may additionally or alternatively correspond to a threshold read margin associated with a refresh operation for the set of data.

At 435, if the target level of reliability is a fourth target level of reliability of the set of target levels of reliability, both the read margin adjustment operation and the error correction operation may be performed. In some examples, the memory device may perform the read margin adjustment operation and the error correction operation for the set of data based on or in response to the command and the fourth target level of reliability, where the fourth target level of reliability may correspond to both of the read margin adjustment operation and the error correction operation. The fourth target level of reliability may additionally or alternatively correspond to a threshold read margin associated with a refresh operation for the set of data.

At 440, it may be determined whether a read margin for the set of data satisfies the threshold read margin corresponding to the third and fourth target levels of reliability. In some examples, the memory device may determine whether the read margin satisfies the threshold read margin by determining whether a logic level (e.g., a potential) of the set of data is above or below a threshold logic level corresponding to the threshold read margin.

The memory device may determine whether the read margin satisfies the threshold read margin after performing the read margin adjustment operation, the error correction operation, or both, corresponding to the third or fourth target level of reliability.

At 445, if the read margin fails to satisfy the threshold read margin, the refresh operation may be performed for the set of data. In some examples, the memory device may perform the refresh operation based on or in response to the read margin failing to satisfy the threshold and determining that the target level of reliability is the third or fourth target level of reliability. The read margin failing to satisfy the threshold may indicate one or more errors are present in the set of data. The refresh operation may be performed to ensure that the errors in the set of data are fixed, such that the set of data may achieve the third or fourth target level of reliability.

Although four example target levels of reliability are illustrated, it is to be understood that any quantity of target levels of reliability may be configured and indicated via the verify command. Additionally or alternatively, the target levels of reliability may correspond to any error management operations not shown, or any combination of error management operations. In one example, the verify command may indicate a fifth target level of reliability. The fifth target level of reliability may be similar to the host device setting the EER bit low (e.g., to 0) in the verify error recovery mode page, as described with reference to FIG. 3.

At 450, if the read margin satisfies the threshold read margin, or if the target level of reliability is the first or second target level of reliability, or after the refresh operation is performed, an indication of a level of reliability of the set of data may be transmitted. In some examples, the memory device may transmit the indication of the level of reliability of the set of data to the host device based on or in response to the verify command and performing the one or more error management operations. The indication of the level of reliability may, in some examples, be transmitted via a response UPIU. The response UPIU may indicate a status response of GOOD, BUSY, or CHECK CONDITION. A status response of GOOD may indicate that the set of data is valid, or not corrupt, and the error management operations were performed successfully. A status response of BUSY may be transmitted if the memory device is still processing the verify command. A status response of CHECK CONDITION may indicate that a failure occurred during the verify operation. The memory device may transmit a SENSE KEY in addition to the status response of CHECK CONDITION to indicate, to the host device, a type of failure that occurred during the verify operation. As such, the verify command status response may indicate a level of reliability of the set of data after the verify operations and error management operations are performed.

In some examples, the host device may determine a second target level of reliability for the set of data based on or in response to the indicated level of reliability. In such cases, the host device may transmit a second verify command to the memory device based on or in response to the second target level of reliability.

A system as described herein may thereby support configurable verify procedures such that a host device may transmit a verify command to a memory device indicating a target level of reliability from a set of configured target levels of reliability. The memory device may perform one or more error management operations configured for the indicated target level of reliability. Such verification techniques may provide for the memory device to verify a set of data and perform configured levels of error management based on a status of the data and a target level of reliability for the data. Verify operations performed according to the configurable verify levels may reduce latency and power consumption and improve a reliability of stored data as compared with other verification techniques in which a verify command may indicate one or two operations to be performed for a set of data.

Figure 5:
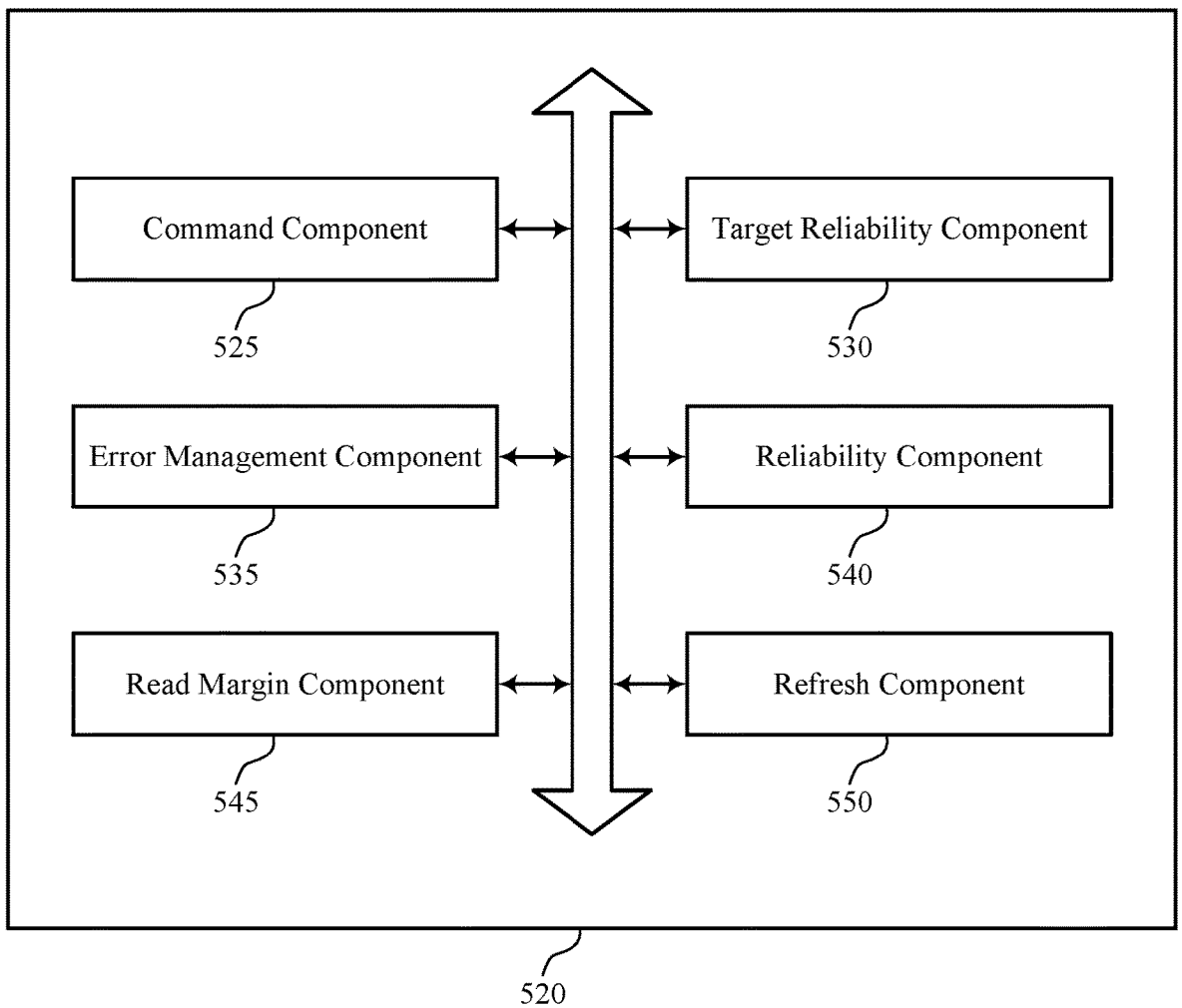
FIG. 5 shows a block diagram of a memory system that supports a configurable verify level in accordance with examples as disclosed herein.

FIG. 5 shows a block diagram 500 of a memory system 520 that supports a configurable verify level in accordance with examples as disclosed herein. The memory system 520 may be an example of aspects of a memory system as described with reference to FIGS. 1 through 4. The memory system 520, or various components thereof, may be an example of means for performing various aspects of configurable verify level as described herein. For example, the memory system 520 may include a command component 525, a target reliability component 530, an error management component 535, a reliability component 540, a read margin component 545, a refresh component 550, or any combination thereof. Each of these components may communicate, directly or indirectly, with one another (e.g., via one or more buses).

The command component 525 may be configured as or otherwise support a means for receiving, from a host device, a command indicating a target level of reliability associated with a set of data stored in a memory device, where the command indicates a request to perform one or more error management operations for the set of data based on the target level of reliability. The target reliability component 530 may be configured as or otherwise support a means for determining the target level of reliability from a set of target levels of reliability each corresponding to a respective one or more error management operations based on the command, where the target level of reliability corresponds to the one or more error management operations. The error management component 535 may be configured as or otherwise support a means for performing the one or more error management operations for the set of data based on the target level of reliability. The reliability component 540 may be configured as or otherwise support a means for transmitting, to the host device in response to the command, an indication of a level of reliability associated with the set of data based on performing the one or more error management operations.

In some examples, the target reliability component 530 may be configured as or otherwise support a means for identifying, in the command, a bit, a bit field, or an attribute configured to indicate the target level of reliability, where determining the target level of reliability from the set of target levels of reliability is based on a value of the bit, a value of the bit field, or one or more parameters conveyed via the attribute.

In some examples, the command is a verify command including a set of reserved bits within a CDB, and the bit, the bit field, or both, are selected from the set of reserved bits to convey the target level of reliability corresponding to a verify operation.

In some examples, the one or more error management operations include an error correction operation according to a reduced error correction capability, a read margin adjustment operation, a refresh operation, an enable early recovery operation, or any combination thereof, in accordance with the target level of reliability. In some examples, the reduced error correction capability corresponds to the error correction operation being performed in a configured time period. In some examples, performing the read margin adjustment operation includes adjusting a read margin to verify the set of data.

In some examples, the target reliability component 530 may be configured as or otherwise support a means for determining that the target level of reliability is a first target level of reliability of the set of target levels of reliability based on the command, where the first target level of reliability corresponds to the read margin adjustment operation or the error correction operation according to the reduced error correction capability. In some examples, the error management component 535 may be configured as or otherwise support a means for performing one of the read margin adjustment operation or the error correction operation in accordance with the first target level of reliability.

In some examples, the target reliability component 530 may be configured as or otherwise support a means for determining that the target level of reliability is a second target level of reliability of the set of target levels of reliability based on the command, where the second target level of reliability corresponds to the read margin adjustment operation and the error correction operation according to the reduced error correction capability. In some examples, the error management component 535 may be configured as or otherwise support a means for performing the read margin adjustment operation and the error correction operation in accordance with the second target level of reliability.

In some examples, the target reliability component 530 may be configured as or otherwise support a means for determining that the target level of reliability is a third target level of reliability of the set of target levels of reliability based on the command, where the third target level of reliability corresponds to the refresh operation and one of the read margin adjustment operation or the error correction operation according to the reduced error correction capability, and where the third target level of reliability indicates a threshold read margin associated with the refresh operation. In some examples, the error management component 535 may be configured as or otherwise support a means for performing one of the read margin adjustment operation or the error correction operation in accordance with the third target level of reliability. In some examples, the read margin component 545 may be configured as or otherwise support a means for determining whether a read margin associated with the set of data satisfies the threshold read margin based on the third target level of reliability and performing the one of the read margin adjustment operation or the error correction operation.

In some examples, the refresh component 550 may be configured as or otherwise support a means for performing the refresh operation for the set of data based on determining that the read margin associated with the set of data fails to satisfy the threshold read margin.

In some examples, the target reliability component 530 may be configured as or otherwise support a means for determining that the target level of reliability is a fourth target level of reliability of the set of target levels of reliability based on the command, where the fourth target level of reliability corresponds to the read margin adjustment operation, the error correction operation according to the reduced error correction capability, and the refresh operation, and where the fourth target level of reliability indicates a threshold read margin associated with the refresh operation. In some examples, the error management component 535 may be configured as or otherwise support a means for performing the read margin adjustment operation and the error correction operation in accordance with the fourth target level of reliability. In some examples, the read margin component 545 may be configured as or otherwise support a means for determining whether a read margin associated with the set of data satisfies the threshold read margin based on the fourth target level of reliability and performing the read margin adjustment operation and the error correction operation.

In some examples, the refresh component 550 may be configured as or otherwise support a means for performing the refresh operation for the set of data based on determining that the read margin associated with the set of data fails to satisfy the threshold read margin.

In some examples, the command component 525 may be configured as or otherwise support a means for receiving, from the host device, a second command indicating a second target level of reliability associated with the set of data based on the indication of the level of reliability of the set of data and the one or more error management operations.

Figure 6:
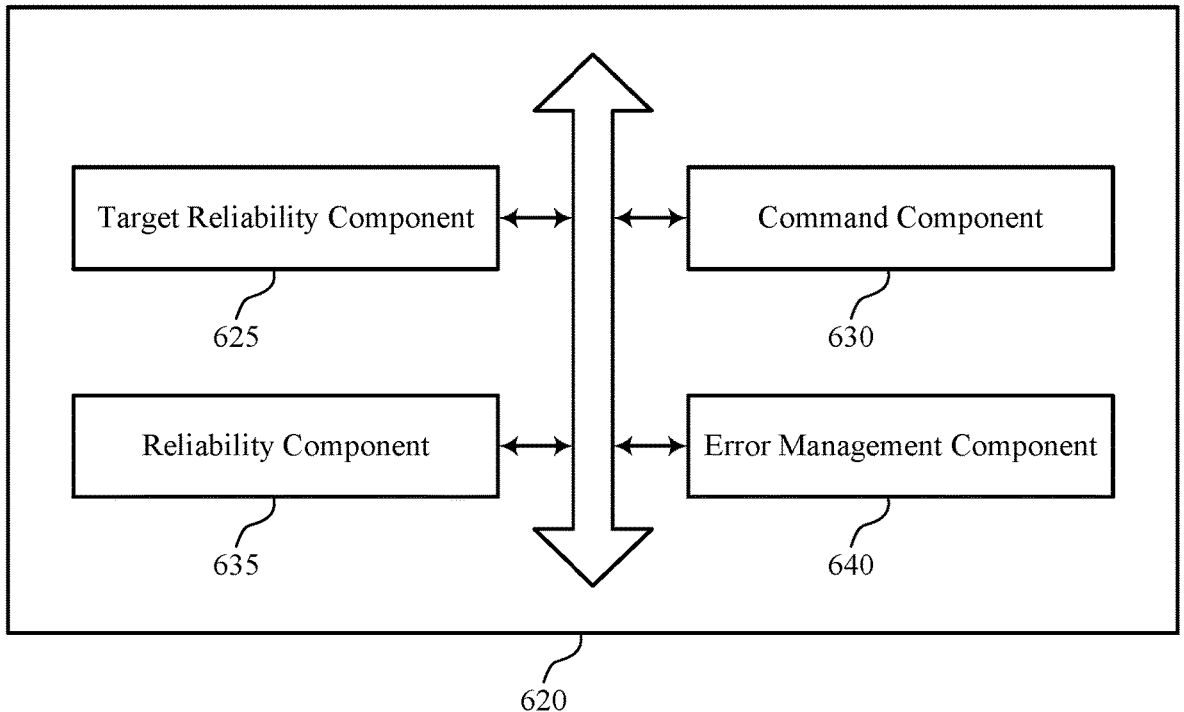
FIG. 6 shows a block diagram of a host system that supports a configurable verify level in accordance with examples as disclosed herein.

FIG. 6 shows a block diagram 600 of a host system 620 that supports a configurable verify level in accordance with examples as disclosed herein. The host system 620 may be an example of aspects of a host system as described with reference to FIGS. 1 through 4. The host system 620, or various components thereof, may be an example of means for performing various aspects of configurable verify level as described herein. For example, the host system 620 may include a target reliability component 625, a command component 630, a reliability component 635, an error management component 640, or any combination thereof. Each of these components may communicate, directly or indirectly, with one another (e.g., via one or more buses).

The target reliability component 625 may be configured as or otherwise support a means for determining a target level of reliability associated with a set of data stored in a memory device coupled with a memory system. The command component 630 may be configured as or otherwise support a means for transmitting, to the memory device, a command indicating the target level of reliability, where the command indicates a request to perform one or more error management operations for the set of data based on the target level of reliability. The reliability component 635 may be configured as or otherwise support a means for receiving, from the memory device in response to the command, an indication of a level of reliability associated with the set of data based on the one or more error management operations.

In some examples, the target reliability component 625 may be configured as or otherwise support a means for transmitting, in the command, a bit, a bit field, or an attribute configured to indicate the target level of reliability selected from a set of target levels of reliability, where the target level of reliability is indicated via a value of the bit, a value of the bit field, or one or more parameters conveyed via the attribute. In some examples, the command is a verify command including a set of reserved bits within a CDB and the bit, the bit field, or both, are selected from the set of reserved bits to convey the target level of reliability corresponding to a verify operation.

In some examples, the target level of reliability is selected from a set of target levels of reliability. In some examples, the one or more error management operations include an error correction operation according to a reduced error correction capability, a read margin adjustment operation, a refresh operation, an enable early recovery operation, or any combination thereof, in accordance with the selected target level of reliability. In some examples, the reduced error correction capability corresponds to the error correction operation performed in a configured time period. In some examples, the read margin adjustment operation corresponds to an adjustment of a read margin to verify the set of data.

In some examples, to support transmitting the command, the command component 630 may be configured as or otherwise support a means for transmitting the command indicating a first target level of reliability of the set of target levels of reliability, where the first target level of reliability corresponds to one of the read margin adjustment operation or the error correction operation according to the reduced error correction capability.

In some examples, to support transmitting the command, the command component 630 may be configured as or otherwise support a means for transmitting the command indicating a second target level of reliability of the set of target levels of reliability, where the second target level of reliability corresponds to the read margin adjustment operation and the error correction operation according to the reduced error correction capability.

In some examples, to support transmitting the command, the command component 630 may be configured as or otherwise support a means for transmitting the command indicating a third target level of reliability of the set of target levels of reliability, where the third target level of reliability corresponds to the refresh operation and one of the read margin adjustment operation or the error correction operation according to the reduced error correction capability, and where the third target level of reliability indicates a threshold read margin associated with the refresh operation.

In some examples, to support transmitting the command, the command component 630 may be configured as or otherwise support a means for transmitting the command indicating a fourth target level of reliability of the set of target levels of reliability, where the fourth target level of reliability corresponds to the read margin adjustment operation, the error correction operation according to the reduced error correction capability, and the refresh operation, and where the fourth target level of reliability indicates a threshold read margin associated with the refresh operation.

In some examples, the command component 630 may be configured as or otherwise support a means for transmitting, to the memory device, a second command indicating a second target level of reliability associated with the set of data based on the indication of the level of reliability of the set of data and the one or more error management operations.

Figure 7:
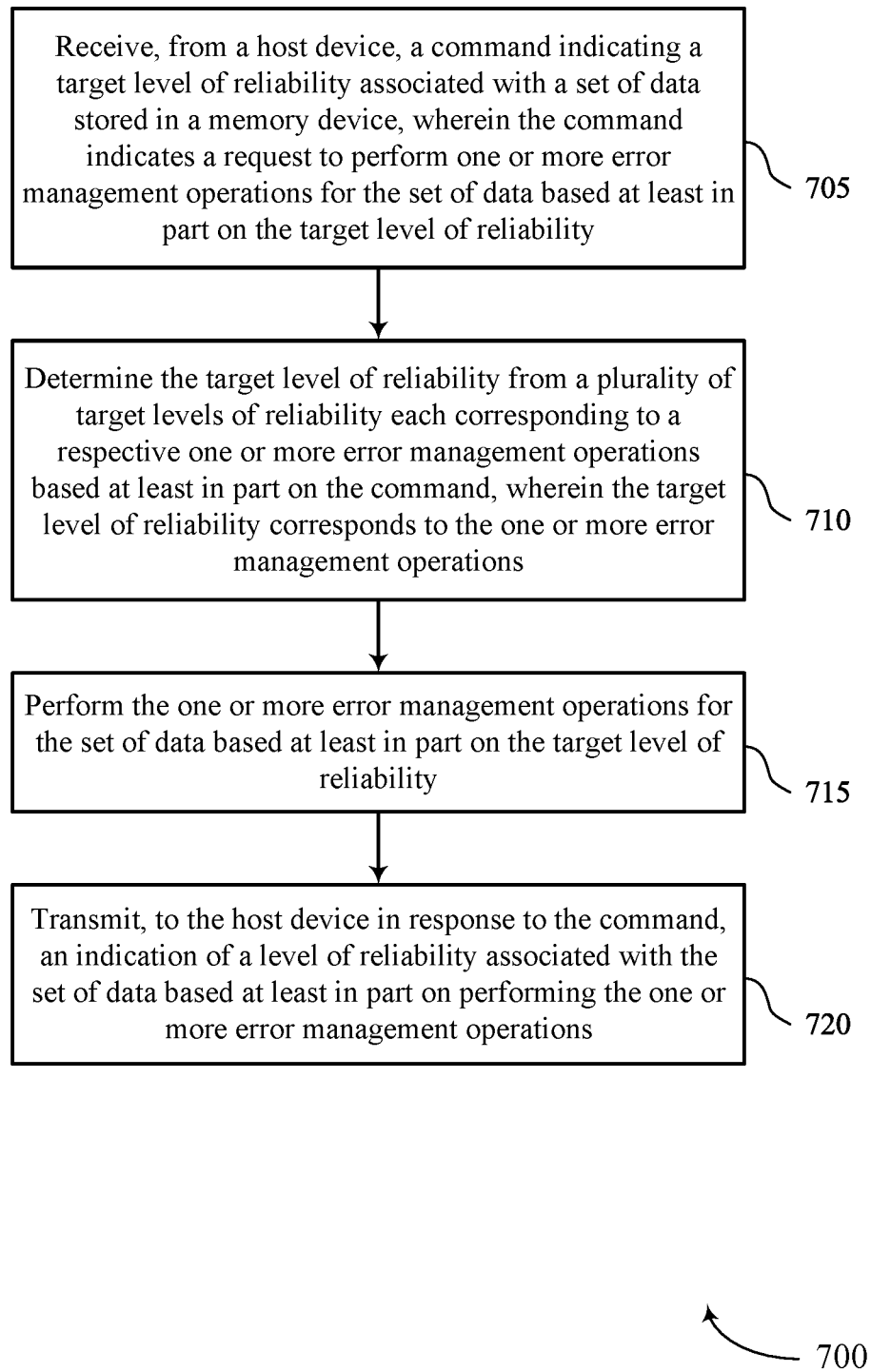
FIGS. 7 and 8 show flowcharts illustrating a method or methods that support configurable verify level in accordance with examples as disclosed herein.

FIG. 7 shows a flowchart illustrating a method 700 that supports a configurable verify level in accordance with examples as disclosed herein. The operations of method 700 may be implemented by a memory system or its components as described herein. For example, the operations of method 700 may be performed by a memory system as described with reference to FIGS. 1 through 5. In some examples, a memory system may execute a set of instructions to control the functional elements of the device to perform the described functions. Additionally or alternatively, the memory system may perform aspects of the described functions using special-purpose hardware.

At 705, the method may include receiving, from a host device, a command indicating a target level of reliability associated with a set of data stored in a memory device, where the command indicates a request to perform one or more error management operations for the set of data based on the target level of reliability. The operations of 705 may be performed in accordance with examples as disclosed herein. In some examples, aspects of the operations of 705 may be performed by a command component 525 as described with reference to FIG. 5.

At 710, the method may include determining the target level of reliability from a set of target levels of reliability each corresponding to a respective one or more error management operations based on the command, where the target level of reliability corresponds to the one or more error management operations. The operations of 710 may be performed in accordance with examples as disclosed herein. In some examples, aspects of the operations of 710 may be performed by a target reliability component 530 as described with reference to FIG. 5.

At 715, the method may include performing the one or more error management operations for the set of data based on the target level of reliability. The operations of 715 may be performed in accordance with examples as disclosed herein. In some examples, aspects of the operations of 715 may be performed by an error management component 535 as described with reference to FIG. 5.

At 720, the method may include transmitting, to the host device in response to the command, an indication of a level of reliability associated with the set of data based on performing the one or more error management operations. The operations of 720 may be performed in accordance with examples as disclosed herein. In some examples, aspects of the operations of 720 may be performed by a reliability component 540 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for receiving, from a host device, a command indicating a target level of reliability associated with a set of data stored in a memory device, where the command indicates a request to perform one or more error management operations for the set of data based on the target level of reliability, determining the target level of reliability from a set of target levels of reliability each corresponding to a respective one or more error management operations based on the command, where the target level of reliability corresponds to the one or more error management operations, performing the one or more error management operations for the set of data based on the target level of reliability, and transmitting, to the host device in response to the command, an indication of a level of reliability associated with the set of data based on performing the one or more error management operations.

Some examples of the method 700 and the apparatus described herein may further include operations, features, circuitry, logic, means, or instructions for identifying, in the command, a bit, a bit field, or an attribute configured to indicate the target level of reliability, where determining the target level of reliability from the set of target levels of reliability may be based on a value of the bit, a value of the bit field, or one or more parameters conveyed via the attribute.

In some examples of the method 700 and the apparatus described herein, the command may be a verify command including a set of reserved bits within a CDB, and the bit, the bit field, or both, may be selected from the set of reserved bits to convey the target level of reliability corresponding to a verify operation.

In some examples of the method 700 and the apparatus described herein, the one or more error management operations include an error correction operation according to a reduced error correction capability, a read margin adjustment operation, a refresh operation, an enable early recovery operation, or any combination thereof, in accordance with the target level of reliability.

In some examples of the method 700 and the apparatus described herein, the reduced error correction capability corresponds to the error correction operation being performed in a configured time period and performing the read margin adjustment operation includes adjusting a read margin to verify the set of data.

Some examples of the method 700 and the apparatus described herein may further include operations, features, circuitry, logic, means, or instructions for determining that the target level of reliability may be a first target level of reliability of the set of target levels of reliability based on the command, where the first target level of reliability corresponds to the read margin adjustment operation or the error correction operation according to the reduced error correction capability and performing one of the read margin adjustment operation or the error correction operation in accordance with the first target level of reliability.

Some examples of the method 700 and the apparatus described herein may further include operations, features, circuitry, logic, means, or instructions for determining that the target level of reliability may be a second target level of reliability of the set of target levels of reliability based on the command, where the second target level of reliability corresponds to the read margin adjustment operation and the error correction operation according to the reduced error correction capability and performing the read margin adjustment operation and the error correction operation in accordance with the second target level of reliability.

Some examples of the method 700 and the apparatus described herein may further include operations, features, circuitry, logic, means, or instructions for determining that the target level of reliability may be a third target level of reliability of the set of target levels of reliability based on the command, where the third target level of reliability corresponds to the refresh operation and one of the read margin adjustment operation or the error correction operation according to the reduced error correction capability, and where the third target level of reliability indicates a threshold read margin associated with the refresh operation, performing one of the read margin adjustment operation or the error correction operation in accordance with the third target level of reliability, and determining whether a read margin associated with the set of data satisfies the threshold read margin based on the third target level of reliability and performing the one of the read margin adjustment operation or the error correction operation.

Some examples of the method 700 and the apparatus described herein may further include operations, features, circuitry, logic, means, or instructions for performing the refresh operation for the set of data based on determining that the read margin associated with the set of data fails to satisfy the threshold read margin.

Some examples of the method 700 and the apparatus described herein may further include operations, features, circuitry, logic, means, or instructions for determining that the target level of reliability may be a fourth target level of reliability of the set of target levels of reliability based on the command, where the fourth target level of reliability corresponds to the read margin adjustment operation, the error correction operation according to the reduced error correction capability, and the refresh operation, and where the fourth target level of reliability indicates a threshold read margin associated with the refresh operation, performing the read margin adjustment operation and the error correction operation in accordance with the fourth target level of reliability, and determining whether a read margin associated with the set of data satisfies the threshold read margin based on the fourth target level of reliability and performing the read margin adjustment operation and the error correction operation.

Some examples of the method 700 and the apparatus described herein may further include operations, features, circuitry, logic, means, or instructions for performing the refresh operation for the set of data based on determining that the read margin associated with the set of data fails to satisfy the threshold read margin.

Some examples of the method 700 and the apparatus described herein may further include operations, features, circuitry, logic, means, or instructions for receiving, from the host device, a second command indicating a second target level of reliability associated with the set of data based on the indication of the level of reliability of the set of data and the one or more error management operations.

Figure 8:
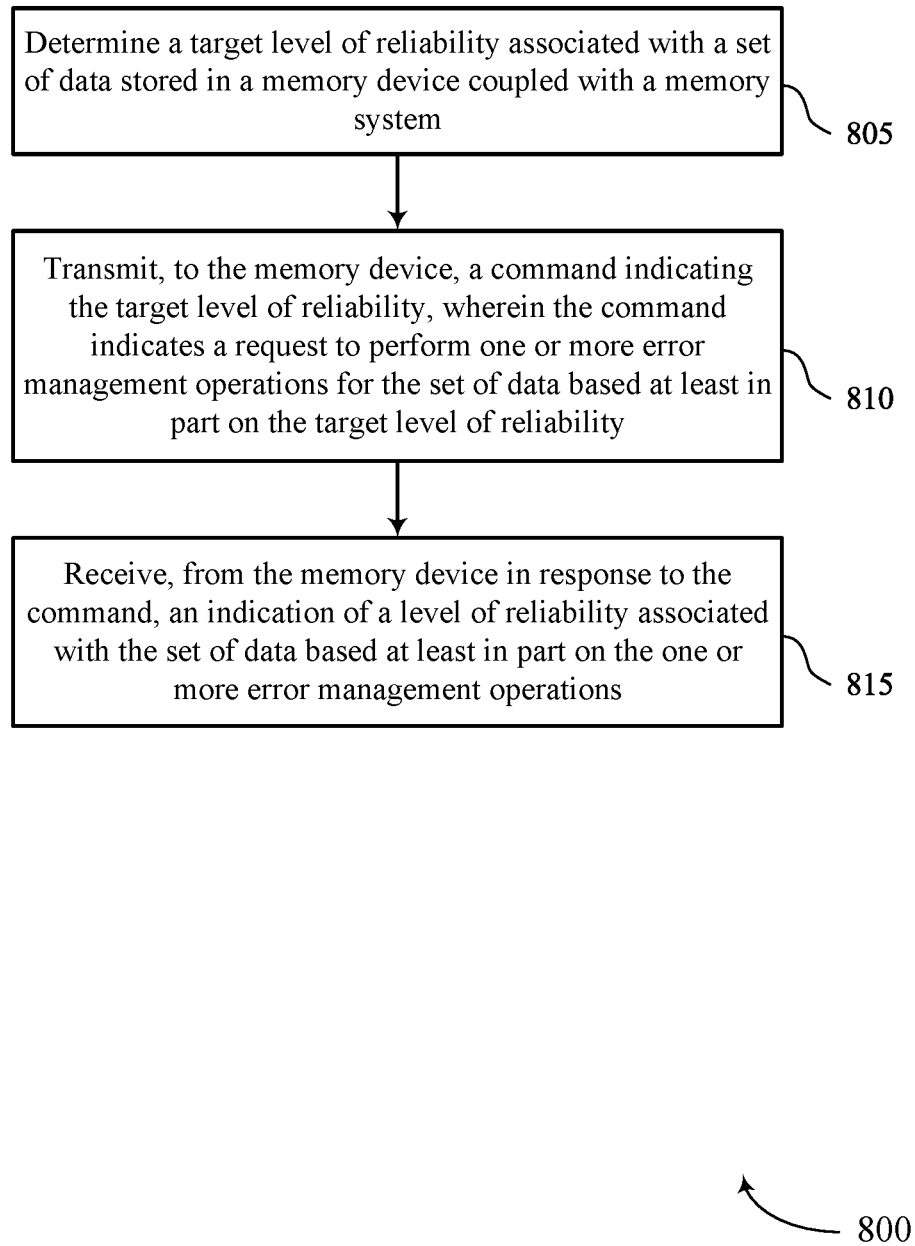

FIG. 8 shows a flowchart illustrating a method 800 that supports a configurable verify level in accordance with examples as disclosed herein. The operations of method 800 may be implemented by a host system or its components as described herein. For example, the operations of method 800 may be performed by a host system as described with reference to FIGS. 1 through 4 and 6. In some examples, a host system may execute a set of instructions to control the functional elements of the device to perform the described functions. Additionally or alternatively, the host system may perform aspects of the described functions using special-purpose hardware.

At 805, the method may include determining a target level of reliability associated with a set of data stored in a memory device coupled with a memory system. The operations of 805 may be performed in accordance with examples as disclosed herein. In some examples, aspects of the operations of 805 may be performed by a target reliability component 625 as described with reference to FIG. 6.

At 810, the method may include transmitting, to the memory device, a command indicating the target level of reliability, where the command indicates a request to perform one or more error management operations for the set of data based on the target level of reliability. The operations of 810 may be performed in accordance with examples as disclosed herein. In some examples, aspects of the operations of 810 may be performed by a command component 630 as described with reference to FIG. 6.

At 815, the method may include receiving, from the memory device in response to the command, an indication of a level of reliability associated with the set of data based on the one or more error management operations. The operations of 815 may be performed in accordance with examples as disclosed herein. In some examples, aspects of the operations of 815 may be performed by a reliability component 635 as described with reference to FIG. 6.

In some examples, an apparatus as described herein may perform a method or methods, such as the method 800. The apparatus may include, features, circuitry, logic, means, or instructions (e.g., a non-transitory computer-readable medium storing instructions executable by a processor) for determining a target level of reliability associated with a set of data stored in a memory device coupled with a memory system, transmitting, to the memory device, a command indicating the target level of reliability, where the command indicates a request to perform one or more error management operations for the set of data based on the target level of reliability, and receiving, from the memory device in response to the command, an indication of a level of reliability associated with the set of data based on the one or more error management operations.

Some examples of the method 800 and the apparatus described herein may further include operations, features, circuitry, logic, means, or instructions for transmitting, in the command, a bit, a bit field, or an attribute configured to indicate the target level of reliability selected from a set of target levels of reliability, where the target level of reliability may be indicated via a value of the bit, a value of the bit field, or one or more parameters conveyed via the attribute.

In some examples of the method 800 and the apparatus described herein, the command may be a verify command including a set of reserved bits within a CDB and the bit, the bit field, or both, may be selected from the set of reserved bits to convey the target level of reliability corresponding to a verify operation.

In some examples of the method 800 and the apparatus described herein, the target level of reliability may be selected from a set of target levels of reliability and the one or more error management operations include an error correction operation according to a reduced error correction capability, a read margin adjustment operation, a refresh operation, an enable early recovery operation, or any combination thereof, in accordance with the selected target level of reliability.

In some examples of the method 800 and the apparatus described herein, the reduced error correction capability corresponds to the error correction operation performed in a configured time period and the read margin adjustment operation corresponds to an adjustment of a read margin to verify the set of data.

In some examples of the method 800 and the apparatus described herein, transmitting the command may include operations, features, circuitry, logic, means, or instructions for transmitting the command indicating a first target level of reliability of the set of target levels of reliability, where the first target level of reliability corresponds to one of the read margin adjustment operation or the error correction operation according to the reduced error correction capability.

In some examples of the method 800 and the apparatus described herein, transmitting the command may include operations, features, circuitry, logic, means, or instructions for transmitting the command indicating a second target level of reliability of the set of target levels of reliability, where the second target level of reliability corresponds to the read margin adjustment operation and the error correction operation according to the reduced error correction capability.

In some examples of the method 800 and the apparatus described herein, transmitting the command may include operations, features, circuitry, logic, means, or instructions for transmitting the command indicating a third target level of reliability of the set of target levels of reliability, where the third target level of reliability corresponds to the refresh operation and one of the read margin adjustment operation or the error correction operation according to the reduced error correction capability, and where the third target level of reliability indicates a threshold read margin associated with the refresh operation.

In some examples of the method 800 and the apparatus described herein, transmitting the command may include operations, features, circuitry, logic, means, or instructions for transmitting the command indicating a fourth target level of reliability of the set of target levels of reliability, where the fourth target level of reliability corresponds to the read margin adjustment operation, the error correction operation according to the reduced error correction capability, and the refresh operation, and where the fourth target level of reliability indicates a threshold read margin associated with the refresh operation.

Some examples of the method 800 and the apparatus described herein may further include operations, features, circuitry, logic, means, or instructions for transmitting, to the memory device, a second command indicating a second target level of reliability associated with the set of data based on the indication of the level of reliability of the set of data and the one or more error management operations.

It should be noted that the methods described above describe possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if" "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally or alternatively (e.g., in an alternative example) be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
   a memory device; and
   a controller coupled with the memory device and configured to cause the apparatus to:
   receive, from a host device, a command indicating a target level of reliability associated with a set of data stored in the memory device, wherein the command indicates a request to perform one or more error management operations for the set of data based at least in part on the target level of reliability;
   determine, based at least in part on the command, the target level of reliability from a plurality of target levels of reliability corresponding to a plurality of respective one or more error management operations comprising the one or more error management operations, wherein the target level of reliability corresponds to the one or more error management operations of the plurality of respective one or more error management operations;
   perform the one or more error management operations for the set of data based at least in part on the target level of reliability; and
   transmit, to the host device in response to the command, an indication of a level of reliability associated with the set of data based at least in part on performing the one or more error management operations.

2. The apparatus of claim 1, wherein the controller is further configured to cause the apparatus to:
   identify, in the command, a bit, a bit field, or an attribute configured to indicate the target level of reliability, wherein determining the target level of reliability from the plurality of target levels of reliability is based at least in part on a value of the bit, a value of the bit field, or one or more parameters conveyed via the attribute.

3. The apparatus of claim 2, wherein the command is a verify command comprising a set of reserved bits within a command descriptor block, and the bit, the bit field, or both, are selected from the set of reserved bits to convey the target level of reliability corresponding to a verify operation.

4. The apparatus of claim 1, wherein the one or more error management operations comprise an error correction operation according to a reduced error correction capability, a read margin adjustment operation, a refresh operation, an enable early recovery operation, or any combination thereof, in accordance with the target level of reliability.

5. The apparatus of claim 4, wherein:
   the reduced error correction capability corresponds to the error correction operation being performed in a configured time period; and
   performing the read margin adjustment operation comprises adjusting a read margin to verify the set of data.

6. The apparatus of claim 4, wherein the controller is further configured to cause the apparatus to:
   determine that the target level of reliability is a first target level of reliability of the plurality of target levels of reliability based at least in part on the command, wherein the first target level of reliability corresponds to the read margin adjustment operation or the error correction operation according to the reduced error correction capability; and
   perform one of the read margin adjustment operation or the error correction operation in accordance with the first target level of reliability.

7. The apparatus of claim 4, wherein the controller is further configured to cause the apparatus to:
   determine that the target level of reliability is a second target level of reliability of the plurality of target levels of reliability based at least in part on the command, wherein the second target level of reliability corresponds to the read margin adjustment operation and the error correction operation according to the reduced error correction capability; and
   perform the read margin adjustment operation and the error correction operation in accordance with the second target level of reliability.

8. The apparatus of claim 4, wherein the controller is further configured to cause the apparatus to:
determine that the target level of reliability is a third target level of reliability of the plurality of target levels of reliability based at least in part on the command, wherein the third target level of reliability corresponds to the refresh operation and one of the read margin adjustment operation or the error correction operation according to the reduced error correction capability, and wherein the third target level of reliability indicates a threshold read margin associated with the refresh operation;
perform one of the read margin adjustment operation or the error correction operation in accordance with the third target level of reliability; and
determine whether a read margin associated with the set of data satisfies the threshold read margin based at least in part on the third target level of reliability and performing the one of the read margin adjustment operation or the error correction operation.

9. The apparatus of claim 8, wherein the controller is further configured to cause the apparatus to:
perform the refresh operation for the set of data based at least in part on determining that the read margin associated with the set of data fails to satisfy the threshold read margin.

10. The apparatus of claim 4, wherein the controller is further configured to cause the apparatus to:
determine that the target level of reliability is a fourth target level of reliability of the plurality of target levels of reliability based at least in part on the command, wherein the fourth target level of reliability corresponds to the read margin adjustment operation, the error correction operation according to the reduced error correction capability, and the refresh operation, and wherein the fourth target level of reliability indicates a threshold read margin associated with the refresh operation;
perform the read margin adjustment operation and the error correction operation in accordance with the fourth target level of reliability; and
determine whether a read margin associated with the set of data satisfies the threshold read margin based at least in part on the fourth target level of reliability and performing the read margin adjustment operation and the error correction operation.

11. The apparatus of claim 10, wherein the controller is further configured to cause the apparatus to:
perform the refresh operation for the set of data based at least in part on determining that the read margin associated with the set of data fails to satisfy the threshold read margin.

12. The apparatus of claim 1, wherein the controller is further configured to cause the apparatus to:
receive, from the host device, a second command indicating a second target level of reliability associated with the set of data based at least in part on the indication of the level of reliability of the set of data and the one or more error management operations.

13. An apparatus, comprising:
a controller configured to couple with a memory system, wherein the controller is configured to cause the apparatus to:
determine a target level of reliability associated with a set of data stored in a memory device coupled with the memory system;
transmit, to the memory device, a command indicating the target level of reliability, wherein the command indicates a request to perform one or more error management operations for the set of data based at least in part on the target level of reliability; and
receive, from the memory device in response to the command, an indication of a level of reliability associated with the set of data based at least in part on the one or more error management operations.

14. The apparatus of claim 13, wherein the controller is further configured to cause the apparatus to:
transmit, in the command, a bit, a bit field, or an attribute configured to indicate the target level of reliability selected from a plurality of target levels of reliability, wherein the target level of reliability is indicated via a value of the bit, a value of the bit field, or one or more parameters conveyed via the attribute.

15. The apparatus of claim 14, wherein the command is a verify command comprising a set of reserved bits within a command descriptor block and the bit, the bit field, or both, are selected from the set of reserved bits to convey the target level of reliability corresponding to a verify operation.

16. The apparatus of claim 13, wherein:
the target level of reliability is selected from a plurality of target levels of reliability; and
the one or more error management operations comprise an error correction operation according to a reduced error correction capability, a read margin adjustment operation, a refresh operation, an enable early recovery operation, or any combination thereof, in accordance with the selected target level of reliability.

17. The apparatus of claim 16, wherein:
the reduced error correction capability corresponds to the error correction operation performed in a configured time period; and
the read margin adjustment operation corresponds to an adjustment of a read margin to verify the set of data.

18. The apparatus of claim 16, wherein, when transmitting the command, the controller is further configured to cause the apparatus to:
transmit the command indicating a first target level of reliability of the plurality of target levels of reliability, wherein the first target level of reliability corresponds to one of the read margin adjustment operation or the error correction operation according to the reduced error correction capability.

19. The apparatus of claim 16, wherein, when transmitting the command, the controller is further configured to cause the apparatus to:
transmit the command indicating a second target level of reliability of the plurality of target levels of reliability, wherein the second target level of reliability corresponds to the read margin adjustment operation and the error correction operation according to the reduced error correction capability.

20. The apparatus of claim 16, wherein, when transmitting the command, the controller is further configured to cause the apparatus to:
transmit the command indicating a third target level of reliability of the plurality of target levels of reliability, wherein the third target level of reliability corresponds to the refresh operation and one of the read margin adjustment operation or the error correction operation according to the reduced error correction capability, and wherein the third target level of reliability indicates a threshold read margin associated with the refresh operation.

21. The apparatus of claim 16, wherein, when transmitting the command, the controller is further configured to cause the apparatus to:

transmit the command indicating a fourth target level of reliability of the plurality of target levels of reliability, wherein the fourth target level of reliability corresponds to the read margin adjustment operation, the error correction operation according to the reduced error correction capability, and the refresh operation, and wherein the fourth target level of reliability indicates a threshold read margin associated with the refresh operation.

22. The apparatus of claim 13, wherein, when transmitting the command, the controller is further configured to cause the apparatus to:

transmit, to the memory device, a second command indicating a second target level of reliability associated with the set of data based at least in part on the indication of the level of reliability of the set of data and the one or more error management operations.

23. A non-transitory computer-readable medium storing code comprising instructions which, when executed by a processor of an electronic device, cause the electronic device to:

receive, from a host device, a command indicating a target level of reliability associated with a set of data stored in a memory device, wherein the command indicates a request to perform one or more error management operations for the set of data based at least in part on the target level of reliability;

determine, based at least in part on the command, the target level of reliability from a plurality of target levels of reliability corresponding to a plurality of respective one or more error management operations comprising the one or more error management operations, wherein the target level of reliability corresponds to the one or more error management operations of the plurality of respective one or more error management operations;

perform the one or more error management operations for the set of data based at least in part on the target level of reliability; and transmit, to the host device in response to the command, an indication of a level of reliability associated with the set of data based at least in part on performing the one or more error management operations.

24. The non-transitory computer-readable medium of claim 23, wherein the instructions, when executed by the processor of the electronic device, further cause the electronic device to:

identify, in the command, a bit, a bit field, or an attribute configured to indicate the target level of reliability, wherein determining the target level of reliability from the plurality of target levels of reliability is based at least in part on a value of the bit, a value of the bit field, or one or more parameters conveyed via the attribute.

25. A non-transitory computer-readable medium storing code comprising instructions which, when executed by a processor of an electronic device, cause the electronic device to:

determine a target level of reliability associated with a set of data stored in a memory device coupled with a memory system;

transmit, to the memory device, a command indicating the target level of reliability, wherein the command indicates a request to perform one or more error management operations for the set of data based at least in part on the target level of reliability; and receive, from the memory device in response to the command, an indication of a level of reliability associated with the set of data based at least in part on the one or more error management operations.

* * * * *